United States Patent
Kondo et al.

(10) Patent No.: US 10,563,793 B2
(45) Date of Patent: Feb. 18, 2020

(54) LOW ALLOY OIL-WELL STEEL PIPE

(71) Applicant: NIPPON STEEL & SUMITOMO METAL CORPORATION, Tokyo (JP)

(72) Inventors: Keiichi Kondo, Wakayama (JP); Yuji Arai, Amagasaki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 349 days.

(21) Appl. No.: 15/328,087

(22) PCT Filed: Jul. 21, 2015

(86) PCT No.: PCT/JP2015/003635
§ 371 (c)(1),
(2) Date: Jan. 23, 2017

(87) PCT Pub. No.: WO2016/013205
PCT Pub. Date: Jan. 28, 2016

(65) Prior Publication Data
US 2017/0219131 A1 Aug. 3, 2017

(30) Foreign Application Priority Data
Jul. 25, 2014 (JP) .................................. 2014-152294

(51) Int. Cl.
| | |
|---|---|
| *F16L 9/02* | (2006.01) |
| *C22C 38/54* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |

(52) U.S. Cl.
CPC .............. *F16L 9/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01)

(58) Field of Classification Search
CPC ...... C21D 1/18; C21D 2211/003; C21D 8/10; C21D 8/105; C21D 9/08; C21D 9/085; C22C 38/00; F16L 9/02

USPC ......................................................... 148/516
See application file for complete search history.

(56) References Cited

U.S. PATENT DOCUMENTS

| | | | | |
|---|---|---|---|---|
| 5,938,865 A | * | 8/1999 | Kondo ..................... | C21D 8/10 148/593 |
| 2012/0204994 A1 | | 8/2012 | Anelli et al. | |
| 2017/0306461 A1 | * | 10/2017 | Kondo ..................... | C21D 9/08 |

FOREIGN PATENT DOCUMENTS

| | | |
|---|---|---|
| CA | 2 801 012 | 12/2011 |
| CA | 2 857 439 | 6/2013 |
| CA | 2849287 | 9/2013 |
| CA | 2888154 | 5/2014 |
| CA | 2 918 673 | 1/2015 |
| EP | 3 231 884 | 10/2017 |
| JP | 59-232220 | 12/1984 |
| JP | 62-253720 | 11/1987 |
| JP | 06-322478 | 11/1994 |
| JP | 08-311551 | 11/1996 |
| JP | 2000-256783 | 9/2000 |
| JP | 2000-297344 | 10/2000 |
| JP | 2005-350754 | 12/2005 |
| JP | 2012-026030 | 2/2012 |
| JP | 2012-519238 | 8/2012 |
| WO | 2010/150915 | 12/2010 |
| WO | 2013/191131 | 12/2013 |

OTHER PUBLICATIONS

Tsuchiyama, Toshihiro, "Physical Meaning of . . . Heat Treatment Process", The Heat Treatment, vol. 42, No. 3, 2002, pp. 163-166.

* cited by examiner

*Primary Examiner* — Jie Yang
(74) *Attorney, Agent, or Firm* — Clark & Brody

(57) ABSTRACT

Provided is a low alloy oil-well steel pipe having a yield strength of 827 MPa or more, and an excellent SSC resistance. The low alloy oil-well steel pipe according to the present invention consisting of: in mass %, C: more than 0.35 to 0.65%; Si: 0.05 to 0.50%; Mn: 0.10 to 1.00%; Cr: 0.40 to 1.50%; Mo: 0.50 to 2.00%; V: 0.05 to 0.25%; Nb: 0.01 to 0.040%; sol.Al: 0.005 to 0.10%; N: 0.007% or less; Ti: 0 to 0.012%; Ca: 0 to 0.005%; and a balance being Fe and impurities, the impurities including: P: 0.020% or less; S: 0.002% or less; O: 0.006% or less; Ni: 0.10% or less; Cu: 0.03% or less; and B: 0.0005% or less, wherein in a microstructure, a number of cementite particles each of which has an equivalent circle diameter of 200 nm or more is 200 particles/100 μm² or more, and a yield strength is 827 MPa or more.

4 Claims, No Drawings

LOW ALLOY OIL-WELL STEEL PIPE

TECHNICAL FIELD

The present invention relates to a steel pipe, more specifically an oil-well steel pipe.

BACKGROUND ART

Deep-well developments of oil wells and gas wells (oil wells and gas wells are collectively referred to simply as "oil wells", hereinafter) require high strength of oil-well steel pipes. Conventionally, 80 ksi-grade (yield stress of 80 to 95 ksi, that is, 551 to 654 MPa) and 95 ksi-grade (yield stress of 95 to 110 ksi, that is, 654 to 758 MPa) oil-well steel pipes have been widely used. However, 110 ksi-grade (yield stress of 110 to 125 ksi, that is, 758 to 862 MPa) oil-well steel pipes have recently come into use.

Most deep-wells contain hydrogen sulfide having corrosiveness. Hence, oil-well steel pipes for use in deep wells are required to have not only a high strength but also a sulfide stress cracking resistance (referred to as a SSC resistance, hereinafter). In general, susceptibility to the SSC is increased along with increase in strength of a steel material.

Steel pipes of 110 ksi grade or less sold as sour-resistant oil-well steel pipes (sour service OCTG) usually have a guaranteed SSC resistance. The guaranteed SSC resistance herein denotes durability performance under the $H_2S$ environment at 1 atm in an evaluation in a test method specified by NACE. Hereinafter, the $H_2S$ environment at 1 atm is referred to as a standard condition.

Meanwhile, a SSC resistance guaranteed for oil-well steel pipes of 125 ksi grade (yield stress of 862 to 965 MPa) is smaller than the above SSC resistance. In these oil-well pipes, only the SSC resistance under an environment in which partial pressure of $H_2S$ is much smaller than that under the standard condition is guaranteed in many cases. This means that, once the lower limit of the yield strength becomes more than 110 ksi (758 MPa), it becomes suddenly difficult to secure an excellent SSC resistance.

On this background, there is a need for sour-resistant oil-well steel pipes that secures the SSC resistance under the $H_2S$ environment at 1 atm, and has a yield strength as great as possible. In this case, even if the lower limit of the yield strength does not reach 125 ksi (862 MPa), the lower limit of the yield strength is required to be as great as possible.

Techniques to enhance the SSC resistance of oil-well steel pipes are disclosed in Japanese Patent Application Publication No. 62-253720 (Patent Literature 1), Japanese Patent Application Publication No. 59-232220 (Patent Literature 2), Japanese Patent Application Publication No. 6-322478 (Patent Literature 3), Japanese Patent Application Publication No. 8-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8), Japanese Patent Application Publication No. 2012-26030 (Patent Literature 9), and International Application Publication No. WO2010/150915 (Patent Literature 10).

Patent Literature 1 proposes a method of enhancing the SSC resistance of an oil-well steel pipe by reducing impurities such as Mn and P. Patent Literature 2 proposes a method of enhancing the SSC resistance of steel by performing quenching twice to refine grains. Patent Literature 3 proposes a method of enhancing the SSC resistance of a 125 ksi-grade steel material by refining steel microstructure through an induction heat treatment. Patent Literature 4 proposes a method of enhancing the SSC resistance of a steel pipe of 110 ksi grade to 140 ksi grade by enhancing hardenability of the steel through direct quenching process, and increasing a tempering temperature.

Each of Patent Literature 5 and Patent Literature 6 proposes a method of enhancing the SSC resistance of a low alloy oil-well steel pipe of 110 ksi grade to 140 ksi grade by controlling the morphology of carbide. Patent Literature 7 proposes a method of enhancing the SSC resistance of an oil-well steel pipe of 125 ksi (862 MPa) grade or more by controlling a dislocation density and a hydrogen diffusion coefficient to be desired values. Patent Literature 8 proposes a method of enhancing the SSC resistance of 125 ksi (862 MPa)-grade steel by quenching low alloy steel containing C of 0.3 to 0.5% several times. Patent Literature 9 proposes a method of employing a two-stage tempering step to control the morphology of carbide and the number of carbide particles. More specifically, in Patent Literature 9, the SSC resistance of 125 ksi (862 MPa)-grade steel is enhanced by suppressing the number density of large $M_3C$ particles or WC particles. Patent Literature 10 proposes a method of coping with both a high strength and the SSC resistance by controlling amount of dissolved Mo, a prior-austenite grain size, and amount of WC precipitate to be desired values.

However, even if applying the techniques disclosed in the above Patent Literatures 1 to 10, in the case of oil-well steel pipes having a yield strength 120 ksi (827 MPa) or more, an excellent SSC resistance cannot be stably obtained in some cases.

SUMMARY OF INVENTION

An object of the present invention is to provide a low alloy oil-well steel pipe having a yield strength of 120 ksi grade or more (827 MPa or more) and an excellent SSC resistance.

A low alloy oil-well steel pipe according to the present invention includes a chemical composition consisting of: in mass %, C: more than 0.35 to 0.65%; Si: 0.05 to 0.50%; Mn: 0.10 to 1.00%; Cr: 0.40 to 1.50%; Mo: 0.50 to 2.00%; V: 0.05 to 0.25%; Nb: 0.01 to 0.04%; sol.Al: 0.005 to 0.10%; N: 0.007% or less; Ti: 0 to 0.012%; Ca: 0 to 0.005%; and a balance being Fe and impurities, the impurities including: P: 0.020% or less; S: 0.002% or less; O: 0.006% or less; Ni: 0.10% or less; Cu: 0.03% or less; and B: 0.0005% or less. In a microstructure, a number of cementite particles each of which has an equivalent circle diameter of 200 nm or more is 200 particles/100 $\mu m^2$ or more. The above low alloy oil-well steel pipe has a yield strength of 827 MPa or more.

The above chemical composition may contain Ti: 0.003 to 0.012%. The above chemical composition may contain Ca: 0.0005 to 0.005%.

The low alloy oil-well steel pipe according to the present invention has a yield strength of 120 ksi grade or more (827 MPa or more) and an excellent SSC resistance.

DESCRIPTION OF EMBODIMENT

Hereinafter, an embodiment of the present invention will be described in details.

The present inventors have studied on a SSC resistance of a low alloy oil-well steel pipe. As a result, the present inventors have found the following findings.

If a steel pipe is subjected to tempering at a low temperature, a large amount of fine cementite is precipitated. The precipitated fine cementite has a flat morphology. Further, if the tempering temperature is low, dislocation density is not decreased. Hydrogen having intruded in the steel is trapped at an interface between the fine cementite having a flat morphology and a parent phase. The hydrogen having intruded in the steel is also trapped in dislocation in the steel. SSC is likely to be caused due to the hydrogen trapped at an interface between the fine cementite and the parent phase and in the dislocation. Hence, if a large amount of fine cementite is formed, and the dislocation density is high, the SSC resistance becomes deteriorated.

To counter this, Mo and V that are alloy elements to enhance a temper softening resistance are contained in the steel pipe, and this steel pipe is subjected to tempering at a high temperature. In this case, the dislocation density becomes decreased. Hence, the SSC resistance becomes enhanced. In addition, in the case of performing tempering at a high temperature, cementite grows into coarse cementite. Fine cementite is flat, as aforementioned, and SSC is likely to be induced in its surface. To the contrary, coarse cementite grows into a spherical form so that its specific surface area becomes reduced. Hence, compared with fine cementite, coarse cementite is unlikely to initiate occurrence of SSC. Accordingly, instead of fine cementite, coarse cementite is formed, thereby enhancing the SSC resistance.

Meanwhile, cementite enhances strength of a steel pipe through precipitation strengthening. As aforementioned, if tempering is performed at a high temperature, coarse cementite is formed, but only a small amount of coarse cementite is formed. In this case, although an excellent SSC resistance can be attained, it is difficult to attain a yield strength of 827 MPa or more.

In the present embodiment, it is configured to increase the number of coarse cementite particles each of which has an equivalent circle diameter of 200 nm or more, thereby obtaining an oil-well steel pipe having a high strength of 827 MPa or more and an excellent SSC resistance. Coarse cementite of which particle has an equivalent circle diameter of 200 nm or more is referred to as "coarse cementite", hereinafter.

In order to attain the above described oil-well steel pipe, in the tempering, low-temperature tempering at 600 to 650° C. is carried out, and thereafter, high-temperature tempering at 670 to 720° C. is carried out. In this case, a large number of fine cementite particles are formed in the low-temperature tempering. Fine cementite particles serve as nucleuses of coarse cementite particles. By precipitating a large number of fine cementite particles in the low-temperature tempering, a large number of fine cementite particles grow in the high-temperature tempering, and consequently, a large number of coarse cementite particles are formed. Hence, the number density of coarse cementite becomes enhanced. Accordingly, it is possible to attain an oil-well steel pipe having a high strength of 827 MPa or more as well as an excellent SSC resistance.

A low alloy oil-well steel pipe according to the present embodiment that has been accomplished based on the above findings includes a chemical composition consisting of: in mass %, C: more than 0.35 to 0.65%; Si: 0.05 to 0.50%; Mn: 0.10 to 1.00%; Cr: 0.40 to 1.50%; Mo: 0.50 to 2.00%; V: 0.05 to 0.25%; Nb: 0.01 to 0.04%; sol.Al: 0.005 to 0.10%; N: 0.007% or less; Ti: 0 to 0.012%; Ca: 0 to 0.005%; and a balance being Fe and impurities, the impurities containing: P: 0.020% or less; S: 0.002% or less; O: 0.006% or less; Ni: 0.10% or less; Cu: 0.03% or less; and B: 0.0005% or less.

In the microstructure, the number of cementite particles each of which has an equivalent circle diameter of 200 nm or more is 200 particles/100 $\mu m^2$ or more. The yield strength of the above low alloy oil-well steel pipe is 827 MPa or more.

The low alloy oil-well steel pipe according to the present embodiment will be described in details, hereinafter.

[Chemical Composition]

The chemical composition of the low alloy oil-well steel pipe according to the present embodiment consisting of the following elements. A sign "%" in the chemical composition denotes "mass %".

C: More than 0.35 to 0.65%

A content of carbon (C) in the low alloy oil-well steel pipe according to the present embodiment is higher than that in a conventional low alloy oil-well steel pipe. C refines a sub-microstructure of martensite, and enhances strength of the steel. C also forms carbide to enhance strength of the steel. If the C content is high, spheroidization of the carbide is encouraged, and the SSC resistance becomes enhanced. For example, the carbide may be cementite and alloy carbide (Mo carbide, V carbide, Nb carbide, Ti carbide, and the like). An excessively low C content cannot attain the above effect. For example, the number of precipitated cementite particles is excessively small, so that strength of the steel becomes deteriorated. On the other hand, an excessively high C content rather deteriorates toughness of the steel as quenched, which results in increase in quench cracking susceptibility. C is an element that stabilizes austenite. Hence, if the C content is excessively high, the volume ratio of retained austenite becomes excessively high, which causes variation in strength. Accordingly, the C content is more than 0.35 to 0.65%. A preferable lower limit of the C content is 0.38%, and more preferably 0.45%, and further more preferably 0.50%. A preferable upper limit of the C content is 0.60%, and more preferably 0.58%.

Si: 0.05% to 0.50%

Silicon (Si) deoxidizes the steel. An excessively low Si content cannot attain this effect. On the other hand, an excessively high Si content rather deteriorates the SSC resistance. Accordingly, the Si content is 0.05% to 0.50%. A preferable lower limit of the Si content is 0.10%, and more preferably 0.17%. A preferable upper limit of the Si content is 0.40%, and more preferably 0.35%.

Mn: 0.10 to 1.00%

Manganese (Mn) deoxidizes the steel. An excessively low Mn content cannot attain this effect. On the other hand, an excessively high Mn content causes segregation at grain boundaries along with impurity elements such as phosphorus (P) and sulfur (S). In this case, the SSC resistance of the steel becomes deteriorated. Accordingly, the Mn content is 0.10 to 1.00%. A preferable lower limit of the Mn content is 0.20%, and more preferably 0.25%. A preferable upper limit of the Mn content is 0.75%, and more preferably 0.50%.

Cr: 0.40 to 1.50%

Chromium (Cr) enhances hardenability of the steel, and enhances strength of the steel. An excessively low Cr content cannot attain the above effect. On the other hand, an excessively high Cr content rather deteriorates toughness and the SSC resistance of the steel. Accordingly the Cr content is 0.40 to 1.50%. A preferable lower limit of the Cr content is 0.43%, and more preferably 0.48%. A preferable upper limit of the Cr content is 0.90%, and more preferably 0.70%.

Mo: 0.50 to 2.00%

Molybdenum (Mo) forms carbide, and enhances the temper softening resistance of the steel. As a result, Mo contributes to enhancement of the SSC resistance by the high-temperature tempering. An excessively low Mo content cannot attain this effect. On the other hand, an excessively high Mo content rather saturates the above effect. Accordingly, the Mo content is 0.50 to 2.00%. A preferable lower limit of the Mo content is 0.60%, and more preferably 0.65%. A preferable upper limit of the Mo content is 1.6%, and more preferably 1.3%.

V: 0.05 to 0.25%

Vanadium (V) forms carbide, and enhances the temper softening resistance of the steel, as similar to Mo. As a result, V contributes to enhancement of the SSC resistance by the high-temperature tempering. An excessively low V content cannot attain the above effect. On the other hand, an excessively high V content rather deteriorates toughness of the steel. Accordingly, the V content is 0.05 to 0.25%. A preferable lower limit of the V content is 0.07%. A preferable upper limit of the V content is 0.15%, and more preferably 0.12%.

Nb: 0.01 to 0.04%

Niobium (Nb) forms carbide, nitride, or carbonitride in combination with C or N. These precipitates (carbide, nitride, and carbonitride) refine a sub-microstructure of the steel by the pinning effect, and enhances the SSC resistance of the steel. An excessively low Nb content cannot attain this effect. On the other hand, an excessively high Nb content forms excessive precipitates, and destabilizes the SSC resistance of the steel. Accordingly, the Nb content is 0.01 to 0.04%. A preferable lower limit of the Nb content is 0.012%, and more preferably 0.015%. A preferable upper limit of the Nb content is 0.035%, and more preferably 0.030%.

sol.Al: 0.005 to 0.10%

Aluminum (Al) deoxidizes the steel. An excessively low Al content cannot attain this effect, and deteriorates the SSC resistance of the steel. On the other hand, an excessively high Ai content results in increase of inclusions, which deteriorates the SSC resistance of the steel. Accordingly, the Al content is 0.005 to 0.10%. A preferable lower limit of the Al content is 0.010%, and more preferably 0.020%. A preferable upper limit of the Al content is 0.07%, and more preferably 0.06%. The "Al" content referred to in the present specification denotes the content of "acid-soluble Al", that is, "sol.Al".

N: 0.007% or Less

Nitrogen (N) is inevitably contained. N forms coarse nitride, and deteriorates the SSC resistance of the steel. Accordingly, the N content is 0.007% or less. A preferable N content is 0.005% or less, and more preferably 0.0045% or less.

If Ti described below is contained in the steel, N forms TiN to refine grains. In this case, a preferable lower limit of the N content is 0.002%.

Ti: 0 to 0.012%

Titanium (Ti) is an optional element, and may not be contained. If contained, Ti forms nitride, and refines grains by the pinning effect. However, an excessively high Ti content coarsens Ti nitride, which deteriorates the SSC resistance of the steel. Accordingly, the Ti content is 0 to 0.012%. A preferable lower limit of the Ti content is 0.003%, and more preferably 0.005%. A preferable upper limit of the Ti content is 0.008%.

Ca: 0 to 0.005%

Calcium (Ca) is an optional element, and may not be contained. If contained, Ca forms sulfide in combination with S in the steel, and improves morphology of inclusions. In this case, toughness of the steel becomes enhanced. However, an excessively high Ca content increases inclusions, which deteriorates the SSC resistance of the steel.

Accordingly, the Ca content is 0 to 0.005%. A preferable lower limit of the Ca content is 0.0005%, and more preferably 0.001%. A preferable upper limit of the Ca content is 0.003%, and more preferably 0.002%.

The balance of the chemical composition of the low alloy oil-well steel pipe according to the present embodiment includes Fe and impurities. Impurities referred to herein denote elements which come from ores and scraps for use as row materials of the steel, or environments of manufacturing processes, and others. In the present embodiment, each content of P, S, O, Ni, and Cu in the impurities is specified as follows.

P: 0.020% or Less

Phosphorus (P) is an impurity. P segregates at grain boundaries, and deteriorates the SSC resistance of the steel. Accordingly, the P content is 0.020% or less. A preferable P content is 0.015% or less, and more preferably 0.010% or less. It is preferable to set the P content to be as small as possible.

S: 0.002% or Less

Sulfur (S) is an impurity. S segregates at grain boundaries, and deteriorates the SSC resistance of the steel. Accordingly, the S content is 0.002% or less. A preferable S content is 0.0015% or less, and more preferably 0.001% or less. It is preferable to set the S content to be as small as possible.

O: 0.006% or Less

Oxygen (O) is an impurity. O forms coarse oxide, and deteriorates a corrosion resistance of the steel. Accordingly, the O content is 0.006% or less. A preferable O content is 0.004% or less, and more preferably 0.0015% or less. It is preferable to set the κ content to be as small as possible.

Ni: 0.10% or Less

Nickel (Ni) is an impurity. Ni deteriorates the SSC resistance of the steel. If the Ni content is more than 0.10%, the SSC resistance becomes significantly deteriorated. Accordingly, the content of Ni as an impurity element is 0.10% or less.

Cu: 0.03% or Less

Copper (Cu) is an impurity. Copper embrittles the steel, and deteriorates the SSC resistance of the steel. Accordingly, the Cu content is 0.03% or less. A preferable Cu content is 0.02% or less.

B: 0.0005% or Less

Boron (B) is an impurity. B forms $M_{23}(CB)_6$ at grain boundaries, and deteriorates the SSC resistance of the steel. A slight amount of effective B (B uncombined with N) is effective to enhance hardenability, but it is relatively difficult to stably secure a sight amount of effective B within the range of the Ti content of the present embodiment. Accordingly, the B content is 0.0005% or less. A preferable B content is 0.0003% or less.

[Microstructure]

The microstructure of the low alloy oil-well steel pipe including the aforementioned chemical composition is formed of tempered martensite and retained austenite of 0 to less than 2% in terms of a volume fraction.

The microstructure of the low alloy oil-well steel pipe according to the present invention is substantially a tempered martensite microstructure. Hence, the yield strength of the low alloy oil-well steel pipe is high. Specifically, the yield strength of the low alloy oil-well steel pipe of the present embodiment is 827 MPa or more (120 ksi grade or more). The yield strength referred to in the present specification is defined by the 0.7% total elongation method.

In the aforementioned low alloy oil-well steel pipe, retained austenite still remains after the quenching in some cases. The retained austenite causes variation in strength.

Accordingly, the volume ratio (%) of the retained austenite is less than 2% in the present embodiment. The volume ratio of the retained austenite is preferably as small as possible. Accordingly, it is preferable that in the microstructure of the aforementioned low alloy oil-well steel pipe, the volume ratio of the retained austenite is 0% (i.e., microstructure formed of tempered martensite).

By controlling the carbon (C) content in the low alloy oil-well steel pipe and the cooling stop temperature at the time of quenching, it is possible to suppress the volume ratio of the retained austenite to be less than 2%. Specifically, the C content of the low alloy oil-well steel pipe is set to be 0.65% or less. In addition, the cooling stop temperature at the time of quenching is set at 50° C. or less. Through this configuration, it is possible to suppress the volume ratio of the retained austenite to be less than 2%.

The volume ratio of the retained austenite is found by using X-ray diffraction analysis by the following process. Samples including central portions of wall thickness of produced low alloy oil-well steel pipes are collected. A surface of each collected sample is subjected to chemical polishing. The X-ray diffraction analysis is carried out on each chemically polished surface by using a CoKα ray as an incident X ray. Specifically, using each sample, respective surface integrated intensities of a (200) plane and a (211) plane in a ferrite phase (α phase), and respective surface integrated intensities of a (200) plane, a (220) plane, and (311) plane in the retained austenite phase (γ phase) are respectively found. Subsequently, the volume ratio Vγ(%) is calculated by using Formula (1) for each combination between each plane in the α phase and each plane in the γ phase (6 sets in total). An average value of the volume ratios Vγ(%) of the 6 sets is defined as the volume ratio (%) of the retained austenite.

$$V\gamma = 100/(1 + (I\alpha \times R\gamma)/(I\gamma \times R\alpha)) \qquad (1),$$

where "Iα" and "Iγ" are respective integrated intensities of the α phase and the γ phase. "Rα" and "Rγ" are respective scale factors of the α phase and the γ phase, and these values are obtained through a crystallographic logical calculation based on the types of the substances and the plane directions.

The aforementioned microstructure can be obtained by carrying out the following producing method.

[Prior-Austenite Grain Size No.]

In the present embodiment, it is preferable that the grain size No. based on ASTM E112 of prior-austenite grains (also referred to as prior-γ grains, hereinafter) in the aforementioned microstructure is 9.0 or more. If the grain size No. is 9.0 or more, it is possible to attain an excellent SSC resistance even if the yield strength is 827 MPa or more. A preferable grain size No. of the prior-γ grains is 9.5 or more.

The grain size No. of the prior-γ grains may be measured by using a steel material after being quenched and before being tempered (so-called material as quenched), or by using a tempered steel material (referred to as a tempered material). The size of the prior-γ grains is never changed in the tempering. Accordingly, the size of the prior-γ grains stays the same using any one of a material as quenched and a tempered material. If steel including the aforementioned chemical composition is used, the grain size No. of the prior-γ grains becomes 9.0 or more through well-known quenching described later.

[Size of Coarse Cementite]

The above mentioned low alloy oil-well steel pipe includes cementite particles each of which is 200 nm or more in terms of the equivalent circle diameter. As aforementioned, hydrogen having intruded in the steel is trapped at the interface between the cementite and the parent phase. Cementite whose particle is 200 nm or more in terms of the equivalent circle diameter (coarse cementite) has a smaller specific surface area compared with that of refine cementite. Hence, if cementite is coarsened, the interfaces between the cementite and the parent phase become reduced. Reduction of the interfaces decreases trap sites of hydrogen, thereby enhancing the SSC resistance of the low alloy oil-well steel pipe. Meanwhile, fine cementite has a greater specific surface area compared with that of coarse cementite. In addition, fine cementite has a needle-like morphology or a flat morphology. In this case, the specific surface area of the cementite becomes further increased. Hence, fine cementite is likely to become an initiator of occurrence of the SSC. Accordingly, the size of the cementite is 200 nm or more in terms of the equivalent circle diameter. The upper limit of the size of the cementite is not limited to specific one, but 350 nm for example.

By appropriately selecting a heat treatment condition in the high-temperature tempering step described later, it is possible to coarsen cementite.

[Number of Coarse Cementite Particles]

In the aforementioned substructure, the number of coarse cementite particles CN is 200 particles/100 µm² or more.

Cementite enhances the yield strength of the steel pipe. Hence, as the number of cementite particles becomes increased, the yield strength of the steel pipe becomes enhanced. Specifically, if there are cementite particles of 200 particles/100 µm' or more, the yield strength of the steel pipe becomes enhanced.

By appropriately selecting the chemical composition and a heat treatment condition in the tempering step described later, it is possible to coarsen fine cementite. If cementite is coarsened, the number of fine cementite particles becomes decreased. As a result, the SSC resistance becomes improved. Specifically, if the number of cementite particles CN each of which has an equivalent circle diameter of 200 nm or more is 200 particles/100 µm² or more, it is possible to attain an excellent SSC resistance even if the steel pipe has a yield strength of 827 MPa or more.

A preferable lower limit of the number of coarse cementite particles CN is 220 particles/100 µm². The upper limit of the number of coarse cementite particles CN is not limited to specific one, but in the case of the aforementioned chemical composition, a preferable upper limit of the number of coarse cementite particles CN is 500 particles/100 µm².

It is difficult to directly measure the number of fine cementite particles. For this reason, this is substituted by measurement of the number of coarse cementite particles. The total amount of cementite is determined by the carbon content in the steel. Consequently, if the number of coarse cementite particles is greater, the number of fine cementite particles becomes smaller. The number of coarse cementite particles CN is measured by the following method.

Samples including central portions of wall thickness of steel pipes are collected. Of a surface of each sample, a surface equivalent to a cross sectional surface (sectional surface vertical to an axial direction of the steel pipe) of each steel pipe (referred to as an observation surface, hereinafter) is polished. Each observation surface after being polished is etched using a nital etching reagent. Specifically, each observation surface is immersed into the nital etching reagent (a mixture of 3% of nitric acid and 97% of ethyl alcohol) for 10 seconds at ordinary temperature and is etched.

Using a scanning electron microscope, any 10 visual fields in each etched observation surface are observed. Each visual field has an area of 10 μm×10 In each visual field, each area of plural cementite particles is found. The area of each cementite particle may be found using image processing software (brand name: Image J1.47v), for example. A diameter of a circle having the same area as that of the obtained area is defined as an equivalent circle diameter of the cementite particle of interest.

In each visual field, cementite particles each of which has an equivalent circle diameter of 200 nm or more (i.e., coarse cementite particles) are identified. A total number of coarse cementite particles TN in all the 10 visual fields are found. Using the total number TN, the number of coarse cementite particles CN is found based on Formula (2).

$$CN=TN/10 \quad (2)$$

The number of coarse cementite particles can be measured in the above manner.

[Producing Method]

An example of a producing method of the low alloy oil-well steel pipe according to the present embodiment will be explained. In this example, the producing method of a seamless steel pipe (low alloy oil-well steel pipe) will be described. The producing method of the seamless steel pipe includes a pipe making step, a quenching step, and a tempering step.

[Pipe Making Step]

Steel including the aforementioned chemical composition is melted, and smelted by using a well-known method. Subsequently, the molten steel is formed into a continuous casted material through a continuous casting process, for example. The continuous casted material is slabs, blooms, or billets, for example. Alternatively, the molten steel may be formed into ingots through an ingot-making process.

Slabs, blooms, or ingots are subjected to hot working into billets. The billets may be formed by hot-rolling or hot-forging the steel.

The billets are hot-worked into raw pipes. First, the billets are heated in a heating furnace. The billets extracted from the heating furnace are subjected to hot working into raw pipes (seamless steel pipes). For example, the Mannesmann process is carried out as the hot working so as to produce the raw pipes. In this case, round billets are piercing-rolled by a piercing machine. The piercing-rolled round billets are further hot-rolled by a mandrel mill, a reducer, a sizing mill, or the like into the raw pipes. The raw pipes may be produced from billets with other hot working methods.

[Quenching Step]

The raw pipes after the hot working are subjected to quenching and tempering. A quenching temperature in the quenching is the $A_{C3}$ point or more. A preferable upper limit of the quenching temperature is 930° C. If the quenching temperature is high, austenite particles become coarsened. In this case, the grain size No. of the prior-γ grains becomes less than 9.0, and thus the SSC resistance is deteriorated. A preferable quenching temperature is 910° C. or less.

At the time of quenching, a preferable cooling rate in a temperature range of 500 to 1000° C. of the raw pipe is 1 to 15° C./second. If the cooling rate in the above temperature range is excessively great, quenching crack may be caused in some cases. On the other hand, if the cooling rate in the above temperature range is excessively small, a large amount of bainite is contained in the microstructure, and thus martensite in the microstructure becomes decreased. A cooling stop temperature at the time of quenching is 50° C.

or less. Thereby the volume ratio of the retained austenite is possible to be suppressed to less than 2%.

The grain size No. of the prior-γ grains of the raw pipe after the above quenching step becomes 9.0 or more. The grain size No. of the prior-γ grains is never changed even after the tempering described below.

[Tempering Step]

The tempering step includes a low-temperature tempering step and a high-temperature tempering step.

[Low-Temperature Tempering Step]

First, the low-temperature tempering step is carried out. The tempering temperature $T_L$ in the low-temperature tempering step is 600 to 650° C. A Larson-Miller parameter $LMP_L$ in the low-temperature tempering step is 17700 to 18750.

The Larson-Miller parameter is defined by Formula (3).

$$LMP=(T+273)\times(20+\text{Log}(t)) \quad (3)$$

In Formula (3), T denotes a tempering temperature (° C.), and t denotes a time (hr).

The tempering step includes a heating process and a soaking process. The Larson-Miller parameter taking account of the heating process can be found by calculating an integrated tempering parameter in accordance with Non-Patent Literature 1 (TSUCHIYAMA, Toshihiro. 2002. "Physical Meaning of Tempering Parameter and Its Application for Continuous Heating or Cooling Heat Treatment Process". "Heat Treatment" Vol. 42(3): pp. 163-166).

In the method of calculating the abovementioned integrated tempering parameter, a time from start of the heating until end of the heating is divided by micro times Δt of total number N. Herein, an average temperature in the (n−1)-th section is defined as $T_{n-1}$ and an average temperature in the n-th section is defined as $T_n$. An LMP (1) corresponding to the first micro time (the section when n=1) can be obtained by following formula.

$$LMP(1)=(T_1+273)\times(20+\log(\Delta t))$$

The LMP (1) can be described as a value equivalent to an LMP calculated based on a temperature $T_2$ and a heating time $t_2$ by following formula.

$$(T_1+273)\times(20+\log(\Delta t))=(T_2+273)\times(20+\log(t_2))$$

The time $t_2$ is a time required (an equivalent time) to obtain an LMP at temperature $T_2$ equivalent to an integrated value of LMP calculated based on a heating at a section before the second section. The heating time at second section (temperature $T_2$) is a time obtained by adding an actual heating time Δt to the time $t_2$. Accordingly, an LMP (2) which is an integrated value of LMP when the heating of the second section is completed can be obtained by following formula.

$$LMP(2)=(T_2+273)\times(20+\log(t_2+\Delta t))$$

By generalizing this formula, following formula can be obtained.

$$LMP(n)=(T_n+273)\times(20+\log(t_n+\Delta t))$$

The LMP (n) is the integrated value of LMP when the heating of n-th section is completed. The time $t_n$ is an equivalent time to obtain an LMP at temperature $T_n$ equivalent to an integrated value of LMP when the heating of the (n−1)-th section is completed. The time $t_n$ can be obtained by Formula (4).

$$\log(t_n)=((T_{n-1}+273)/(T_n+273))\times(20+\log(t_{n-1}))-20 \quad (4)$$

In the low-temperature tempering step, as described above, a large amount of C (carbon) supersaturatedly dissolved in the martensite is precipitated as cementite. The precipitated cementite at this stage is fine cementite, and serves as a nucleus of coarse cementite. An excessively low temperature of the low-temperature tempering Ti. or an excessively low $LMP_L$ results in a small amount of precipitated cementite. On the other hand, an excessively high temperature of the low-temperature tempering $T_1$ or an excessively high $LMP_L$ causes growth of coarse cementite, but results in a small amount of precipitated cementite.

If the temperature of the low-temperature tempering $T_L$ is 600 to 650° C., and the $LMP_L$ is 17700 to 18750, a large amount of fine cementite serving as a nucleus of coarse cementite is precipitated in the low-temperature tempering step.

[High-Temperature Tempering Step]

The high-temperature tempering step is carried out after the low-temperature tempering step. In the high-temperature tempering step, the fine cementite precipitated in the low-temperature tempering step is coarsened, thereby forming coarse cementite. Accordingly, it is possible to prevent the cementite from becoming an initiator of SSC, as well as to enhance strength of the steel with the coarse cementite.

In the high-temperature tempering step, dislocation density in the steel is reduced. Hydrogen having intruded in the steel is trapped in the dislocation, and becomes an initiator of SSC. Hence, if the dislocation density is lower, the SSC resistance becomes enhanced. The dislocation density in the steel becomes reduced by carrying out the high-temperature tempering step. Accordingly, the SSC resistance becomes enhanced.

For the purpose of attaining the above effect, the tempering temperature Tu in the high-temperature tempering step is 670 to 720° C., and the Larson-Miller parameter $LMP_H$ defined by Formula (3) and Formula (4) is 18500 to 20500.

If the tempering temperature $T_H$ is excessively low, or the $LMP_H$ is excessively low, the cementite is not coarsened, and the number of the coarse cementite particles becomes less than 200 particles/100 $\mu m^2$. Furthermore, the dislocation density is not sufficiently reduced. Consequently, the SSC resistance is deteriorated.

On the other hand, if the tempering temperature $T_H$ is excessively high, or the $LMP_H$ is excessively high, the dislocation density is excessively reduced. In this case, the yield strength of the steel pipe including the aforementioned chemical composition becomes less than 827 MPa.

In the tempering step of the present embodiment, the two-stage tempering including the low-temperature tempering step and the high-temperature tempering step may be carried out, as aforementioned. Specifically, the steel pipe is cooled down to a normal temperature after the low-temperature tempering step is carried out. Subsequently, the high-temperature tempering step is carried out by heating the steel pipe having the normal temperature. Alternatively, immediately after the low-temperature tempering step is carried out, the high-temperature tempering step may be carried out by heating the steel pipe up to the temperature of the high-temperature tempering $T_H$ without cooling the steel pipe.

Alternatively, the low-temperature tempering step and the high-temperature tempering step may be continuously carried out in such a manner that the temperature of the steel pipe is brought to a high-temperature range at a low heating rate so as to increase the retaining time in a temperature range of 600 to 650° C. (tempering with slow temperature increase). For example, at the time of tempering the steel pipe after being quenched, the steel pipe is continuously heated up to 710° C. at an average heating rate of 3° C./minute or less in a temperature range of 500° C. to 700°

C., and the steel pipe is soaked at 710° C. for a predetermined time (e.g., for 60 minutes). In this case, it is only required that an integrated value of the Larson-Miller parameter $LMP_L$ in the temperature range of the low-temperature tempering $T_L$ (i.e., 600 to 650° C. range) is 17700 to 18750, and an integrated value of the Larson-Miller parameter $LMP_H$ in the temperature range of the high-temperature tempering $T_H$ (i.e., 670 to 720° C. range) is 18500 to 20500. In other words, in the tempering step, as far as the $LMP_L$ in the temperature range of the low-temperature tempering $T_L$ satisfies the above condition, and the $LMP_H$ in the temperature range of the high-temperature tempering $T_H$ satisfies the above condition, the tempering method is not limited to specific one.

Through the above producing method, the low alloy seamless steel pipe according to the present embodiment is produced. The microstructure of the produced seamless steel pipe is formed of the tempered martensite and the retained austenite of 0 to less than 2%. In addition, the grain size No. of the prior-γ grains is 9.0 or more. Through the above described tempering step, the number of coarse cementite particles CN in the microstructure becomes 200 particles/100 $\mu m^2$ or more.

[Heat Treatment Other than Quenching and Tempering]

In the producing method of the present embodiment, other heat treatment (intermediate heat treatment) may be carried out additionally after the pipe making step and before the quenching step. For example, the raw pipe after the hot working may be subjected to normalizing treatment. Specifically, the raw pipe after the hot working is retained at a temperature higher than the $A_3$ point (e.g., 850 to 930° C.) for a predetermined time, and subsequently the raw pipe is subjected to allowing cooling. The retaining time is 15 to 130 minutes, for example.

In the normalizing treatment, the raw pipe after the hot working is usually cooled down to a normal temperature, and thereafter, is heated up to the $A_{C3}$ point or more. However, the normalizing treatment in the present embodiment may be carried out such that the raw pipe after the hot working is retained at a temperature of the Acs point or more after the hot working.

By carrying out the normalizing treatment, the prior-γ grains are further refined. Specifically, if the raw pipe subjected to the normalizing treatment is quenched, the grain size No. of the prior-γ grains of the material as quenched becomes 9.5 or more.

Instead of the above normalizing treatment, quenching may be carried out. In this case, the quenching is carried out plural times. The above intermediate treatment may be heat treatment at a two-phase region temperature of ferrite+ austenite (referred to as a "two-phase region heating", hereinafter). In the intermediate heat treatment, it is only required that at least part of the microstructure of the steel is transformed to austenite. In this case, it is possible to attain a preferable effect due to grain refinement. Accordingly, in the intermediate heat treatment, it is sufficient to soak the raw pipe at least at a temperature of the $A_{C1}$ point or more.

EXAMPLE

There was produced molten steel including each chemical composition as shown in Table 1A and Table 1B.

TABLE 1A

Chemical Composition (Unit: mass %, Balance: Fe and Impurities)

| Steel | C | Si | Mn | Cr | Mo | V | Nb | sol. Al | N |
|---|---|---|---|---|---|---|---|---|---|
| A | 0.53 | 0.27 | 0.43 | 0.52 | 0.68 | 0.088 | 0.031 | 0.029 | 0.0038 |
| B | 0.50 | 0.26 | 0.43 | 0.51 | 1.57 | 0.090 | 0.033 | 0.033 | 0.0051 |
| C | 0.60 | 0.29 | 0.43 | 0.52 | 0.71 | 0.090 | 0.030 | 0.039 | 0.0034 |
| D | 0.51 | 0.31 | 0.47 | 1.04 | 0.70 | 0.100 | 0.013 | 0.030 | 0.0026 |
| E | 0.20 | 0.20 | 0.60 | 0.59 | 0.69 | 0.060 | 0.012 | 0.035 | 0.0036 |

TABLE 1B (Continued from TABLE 1A)

Chemical Composition (Unit: mass %, Balance: Fe and Impurities)

| Steel | Ti | Ca | P | S | O | Ni | Cu | B |
|---|---|---|---|---|---|---|---|---|
| A | 0.006 | — | 0.007 | 0.0010 | 0.0009 | 0.01 | 0.01 | 0.0002 |
| B | 0.005 | — | 0.006 | 0.0005 | 0.0009 | 0.02 | 0.03 | 0.0001 |
| C | 0.005 | — | 0.007 | 0.0005 | 0.0008 | 0.04 | 0.01 | 0.0001 |
| D | 0.009 | 0.0018 | 0.012 | 0.0014 | 0.0007 | 0.03 | 0.01 | 0.0001 |
| E | 0.008 | 0.0020 | 0.005 | 0.0015 | 0.0010 | 0.01 | 0.01 | 0.0012 |

With reference to Table 1A and Table 1B, all the chemical compositions of Steel A to Steel D were within the range of the present invention. The C content of Steel E was excessively low, further, the B content of Steel E was excessively high.

Molten steel was continuously casted into blooms. The blooms were bloomed into round billets each having a diameter of 310 mm. The round billets were piercing-rolled and drawing-rolled into seamless steel pipes each having a diameter of 244.48 mm and a wall thickness of 13.84 mm through the Mannesmann-mandrel process.

Each seamless steel pipe was subjected to the normalizing treatment. The normalizing temperature for each pipe was 920° C., and the soaking time at the normalizing temperature for each pipe was 15 minutes. Each of the seamless steel pipes after the normalizing treatment was cooled down to a room temperature (24° C.).

Each of the seamless steel pipes cooled down to the room temperature was subjected to the quenching. The quenching temperature for each pipe was 900° C. Each of the seamless steel pipes was soaked at the quenching temperature for 15 minutes. After the soaking, each seamless steel pipe was subjected to mist cooling. During the mist cooling, an average cooling rate in a temperature range of 500 to 100° C. of each seamless steel pipe was 5° C./second. The cooling stop temperature at the time of quenching was 50° C. or less.

Each of the seamless steel pipes after being quenched was subjected to the tempering as shown in Table 2.

TABLE 2

| Test No. | Steel | First-stage Tempering | | | Second-stage Tempering | | | Note |
|---|---|---|---|---|---|---|---|---|
| | | $T_L$(° C.) | $t_L$(min) | $LMP_L$ | $T_H$(° C.) | $t_H$(min) | $LMP_H$ | |
| 1 | A | 600 | 120 | 17732 | 695 | 60 | 19382 | Inventive Example |
| 2 | A | 600 | 120 | 17732 | 700 | 60 | 19483 | Inventive Example |
| 3 | A | 600 | 120 | 17732 | 705 | 60 | 19585 | Inventive Example |
| 4 | A | 600 | 120 | 17732 | 710 | 60 | 19687 | Inventive Example |
| 5 | B | 600 | 120 | 17732 | 700 | 80 | 19599 | Inventive Example |
| 6 | B | 600 | 120 | 17732 | 700 | 45 | 19369 | Inventive Example |
| 7 | B | 600 | 120 | 17732 | 710 | 45 | 19573 | Inventive Example |
| 8 | C | Low Heating Rate | | 17743 | 710 | 45 | 19633 | Inventive Example |
| 9 | C | 600 | 120 | 17732 | 700 | 60 | 19483 | Inventive Example |
| 10 | C | 600 | 120 | 17732 | 700 | 80 | 19599 | Inventive Example |
| 11 | C | 600 | 120 | 17732 | 700 | 45 | 19369 | Inventive Example |
| 12 | D | 600 | 180 | 17916 | 715 | 90 | 19954 | Inventive Example |
| 13 | D | Low Heating Rate | | 17743 | 710 | 45 | 19633 | Inventive Example |
| 14 | A | 690 | 60 | 19282 | — | — | — | Comparative Example |
| 15 | A | 695 | 60 | 19382 | — | — | — | Comparative Example |
| 16 | A | 700 | 60 | 19483 | — | — | — | Comparative Example |
| 17 | A | 705 | 60 | 19585 | — | — | — | Comparative Example |
| 18 | B | 700 | 45 | 19369 | — | — | — | Comparative Example |
| 19 | C | 700 | 45 | 19369 | — | — | — | Comparative Example |

TABLE 2-continued

| Test | | First-stage Tempering | | | Second-stage Tempering | | | |
|---|---|---|---|---|---|---|---|---|
| No. | Steel | $T_L$(° C.) | $t_L$(min) | $LMP_L$ | $T_H$(° C.) | $t_H$(min) | $LMP_H$ | Note |
| 20 | C | 700 | 30 | 19213 | — | — | — | Comparative Example |
| 21 | D | 705 | 40 | 19425 | — | — | — | Comparative Example |
| 22 | E | 600 | 120 | 17732 | 700 | 60 | 19483 | Comparative Example |

With reference to Table 2, in Test No. 1 to 7 Test No. 9 to 12, and Test 22 two-stage tempering was carried out. Specifically, in each Test No., first, the low-temperature tempering was carried out under tempering conditions ($T_L$, $LMP_L$) as shown in Table 2. Reference Numeral $t_L$ in Table 2 denotes an actual soaking time (minutes) at the tempering temperature $T_L$. After the low-temperature tempering was carried out, each seamless steel pipe was subjected to allowing cooling to be cooled down to a room temperature (25° C.). Using the seamless steel pipe after the allowing cooling, the high-temperature tempering was carried out under tempering conditions ($T_H$, $t_H$, $LMP_H$) as shown in Table 2. Reference Numeral $t_H$ in Table 2 denotes an actual soaking time (minutes) at the tempering temperature $T_H$. In each Test No., the heating rate in the heating process was 8° C./minute, and the temperature of each seamless steel pipe was continuously increased. Taking account of the heating process for each Test No., the $LMP_L$ and the $LMP_H$ were respectively calculated in the above manner. In calculation of the $LMP_L$ and the $LMP_H$, $\Delta t$ was set to 1/60 hour (1 minute). Except Test No. 8 and Test No. 13, $T_1$ (the average temperature of the first section) was set to the temperature 100° C. lower than the soaking temperature. The results are shown in Table 2.

In Test No. 8 and Test No. 13, the temperature of each seamless steel pipe was continuously increased at a heating rate of 2° C./minute until the tempering temperature reached 710° C., and after the tempering temperature reached 710° C., each steel pipe was soaked at 710° C. for the corresponding time $t_H$ as shown in Table 2. Specifically, in Test No. 8 and Test No. 13, tempering at a low heating rate was carried out. In the tempering at a low heating rate, each $LMP_L$ in a tempering temperature range of 600 to 650° C. was as shown in Table 2. Each total $LMP_H$ of the LMP where the tempering temperature was increased from 670 to 710° C. and the LMP where each pipe was soaked at 710° C. for $t_H$ minutes was as shown in Table 2.

Each $LMP_L$ and each $LMP_H$ in the continuous temperature increasing of Test No. 8 and Test No. 13 were calculated by calculating respective integrated tempering parameters in accordance with Non-Patent Literature 1 in the same manner as the above.

In each of Test No. 14 to Test No. 21, only one-stage tempering (high-temperature tempering) was carried out.

[Prior-γ Grain Size No. Measurement Test]

Using the seamless steel pipe after being quenched of each Test No., the prior-γ grain size No. conforming to ASTM 112E was found. Each obtained prior-γ grain size No. is shown in Table 3. Each prior-γ grain size No. was 9.0 or more.

[Microstructure Observation Test]

A sample including a central portion of wall thickness of the seamless steel pipe after being tempered in each Test No. was collected. Of each collected sample, a sample surface of a cross section vertical to the axial direction of each seamless steel pipe was polished. After being polished, each polished sample surface was etched using natal. Specifically each sample surface was immersed into the nital etching reagent (a mixture of 3% of nitric acid and 97% of ethyl alcohol) for 10 seconds at ordinary temperature and was etched. Each etched surface was observed with a microscope, and as a result, in each Test No., the sample bad a microstructure formed of the tempered martensite. The volume ratio of the retained austenite was measured in the above described manner, and as a result, in each Test No., the volume ratio of the retained austenite was less than 2%.

[Number of Coarse Cementite Particles CN]

Using the seamless steel pipe after being tempered of each Test No., the number of coarse cementite particles CN (particles/100 μm$^2$) was found in the above described manner. Each obtained number of coarse cementite particles CN was shown in Table 3.

[Yield Strength Test]

A No. 12 test specimen (width: 25 mm, gage length: 50 mm) specified in JIS Z2241 (2011) was collected from a central portion of wall thickness of the seamless steel pipe of each Test No. A central axis of each test specimen was located at the central position of the wall thickness of each seamless steel pipe, and was parallel with the longitudinal direction of each seamless steel pipe. Using each collected test specimen, a tensile test conforming to JIS Z2241 (2011) was carried out in the atmosphere at a normal temperature (24° C.) so as to find a yield stress (YS). The yield stress was found by the 0.7% total elongation method. Each obtained yield stress (MPa) was shown in Table 3. In each Test No., the yield stress of the seamless steel pipe was 827 MPa or more. In addition, the steel pipes each having a yield strength of 125 ksi grade (862 to 925 MPa) were obtained.

[DCB Test]

The seamless steel pipe of each Test No. was subjected to a DCB (double cantilever beam) test so as to evaluate the SSC resistance.

Specifically, three DCB test specimens each of which had a thickness of 10 mm, a width of 25 mm, and a length of 100 mm were collected from each seamless steel pipe. A wedge having a thickness of 2.89 mm was driven into a central portion of wall thickness of each collected DCB test specimen, and this was defined as an initial crack. A length from a load point to a front end of the initial crack was approximately 33.75 mm. Using these test specimens, the DCB test was carried out in compliance with NACE (National Association of Corrosion Engineers) TM0177-2005 Method D. A 5% salt+0.5% acetic acid aqueous solution having a normal temperature (24° C.) in which hydrogen sulfide gas at 1 atm was saturated was used for a test bath. The DCB test was carried out in such a manner that each DCB test specimen was immersed in the test bath for 336 hours.

After the test, a length of crack propagation "a" generated in each DCB test specimen was measured. Using the measured length of the crack propagation "a" and a wedge-release stress P, each stress intensity factor $K_{ISSC}$(ksi√in) was found based on the following Formula (5).

$$K_{ISSC}=Pa((2(\sqrt{3})+2.38\times(h/a))\times(B/Bn)^{1/(\sqrt{3})})/(B\times h^{3/2}) \quad (5)$$

In Formula (5), "h" denotes a height of each arm of each DCB test specimen, "B" denotes a thickness of each DCB test specimen, and "Bn" denotes a web thickness of each DCB test specimen. These are specified in the above NACE TM0177-2005 Method D.

An average value of the stress intensity factors of the three DCB test specimens in each Test No. was defined as a stress intensity factor $K_{ISSC}$ of Test No. of interest. Furthermore, a standard deviation of the stress intensity factors of the three DCB test specimens was also found.

[Test Results]

appropriate. Each seamless steel pipe had a grain size No. of the prior-γ grains of 9.0 or more, and the number of coarse cementite particles CN of 200 particles/100 μm² or more. Hence, each $K_{ISSC}$ was greater than 22.6 MPam$^{0.5}$, and an excellent SSC resistance was obtained. In addition, the standard deviation of each $K_{ISSC}$ was 2.0 MPam$^{0.5}$ or less, so that a stable SSC resistance could be attained.

Each of Test No. 8 and Test No. 13 had an appropriate chemical composition. The low-heating rate tempering was carried out, and each condition thereof was appropriate. Each seamless steel pipe had a grain size No. of the prior-γ grains of 9.0 or more, and the number of coarse cementite particles CN of 200 particles/100 μm² or more. Each $K_{ISSC}$ was greater than 22.6 MPam$^{0.5}$, and an excellent SSC resistance was obtained. In addition, the standard deviation of each $K_{ISSC}$ was 0.8 MPam$^{0.5}$ or less, so that a stable SSC resistance could be attained.

TABLE 3

| Test No. | Steel | Prior-γ Grain Size No. | CN (grains/ 100 μm²) | YS (MPa) | YS (ksi) | $K_{ISSC}$ Average Value (MPa√m) | $K_{ISSC}$ Average Value (ksi√inch) | $K_{ISSC}$ Standard Deviation (MPa√m) | $K_{ISSC}$ Standard Deviation (ksi√inch) | Note |
|---|---|---|---|---|---|---|---|---|---|---|
| 1 | A | 9.5 | 205 | 917 | 133 | 24.0 | 21.8 | 0.3 | 0.3 | Inventive Example |
| 2 | A | 9.5 | 220 | 883 | 128.1 | 24.5 | 22.3 | 0.8 | 0.7 | Inventive Example |
| 3 | A | 9.7 | 225 | 862 | 125 | 25.6 | 23.3 | 1.6 | 1.5 | Inventive Example |
| 4 | A | 9.6 | 240 | 843 | 122.2 | 27.4 | 24.9 | 1.1 | 1.0 | Inventive Example |
| 5 | B | 10 | 210 | 852 | 123.6 | 26.9 | 24.5 | 0.8 | 0.8 | Inventive Example |
| 6 | B | 10 | 250 | 877 | 127.2 | 25.8 | 23.4 | 0.6 | 0.5 | Inventive Example |
| 7 | B | 10 | 300 | 896 | 130 | 24.8 | 22.5 | 0.7 | 0.6 | Inventive Example |
| 8 | C | 11.1 | 260 | 838 | 121.5 | 26.3 | 24.0 | 0.5 | 0.5 | Inventive Example |
| 9 | C | 11.1 | 245 | 844 | 122.4 | 25.5 | 23.2 | 0.5 | 0.5 | Inventive Example |
| 10 | C | 11.1 | 320 | 856 | 124.2 | 25.5 | 23.2 | 0.2 | 0.2 | Inventive Example |
| 11 | C | 11.1 | 230 | 876 | 127.1 | 24.9 | 22.7 | 1.2 | 1.1 | Inventive Example |
| 12 | D | 10.5 | 230 | 831 | 120.5 | 26.0 | 23.7 | 1.1 | 1.0 | Inventive Example |
| 13 | D | 10.5 | 205 | 874 | 126.8 | 24.8 | 22.6 | 0.8 | 0.8 | Inventive Example |
| 14 | A | 9.5 | 120 | 925 | 134.2 | 20.0 | 18.2 | 2.2 | 2.0 | Comparative Example |
| 15 | A | 9.8 | 130 | 896 | 130 | 19.6 | 17.8 | 2.2 | 2.0 | Comparative Example |
| 16 | A | 9.7 | 140 | 872 | 126.5 | 21.0 | 19.1 | 2.3 | 2.1 | Comparative Example |
| 17 | A | 9.5 | 160 | 862 | 125 | 22.6 | 20.5 | 2.2 | 2.0 | Comparative Example |
| 18 | B | 10 | 160 | 896 | 130 | 21.4 | 19.4 | 2.5 | 2.3 | Comparative Example |
| 19 | C | 11.1 | 190 | 872 | 126.5 | 21.1 | 19.2 | 2.4 | 2.1 | Comparative Example |
| 20 | C | 11.1 | 175 | 896 | 130 | 20.7 | 18.9 | 2.3 | 2.1 | Comparative Example |
| 21 | D | 10.5 | 140 | 878 | 127.3 | 19.8 | 18.0 | 2.3 | 2.1 | Comparative Example |
| 22 | E | 9.6 | 35 | 793 | 115 | 22.5 | 20.5 | — | — | Comparative Example |

With reference to Table 3, each of Test No. 1 to Test No. 7 and Test No. 9 to Test No. 12 had an appropriate chemical composition. In the tempering, the two-stage tempering (the low-temperature tempering and the high-temperature tempering) was carried out, and each tempering condition was Meanwhile, in each of Test No. 14 to Test No. 21, no low-temperature tempering was carried out. Consequently, in each Test No., the number of coarse cementite particles CN was less than 200 particles/100 μm². As a result, each $K_{ISSC}$ was 22.6 MPam$^{0.5}$ or less, so that the SSC resistance was small. The standard deviation of each $K_{ISSC}$ was greater than 2.0 MPam$^{0.5}$, so that no stable SSC resistance could be attained.

A chemical composition of Test No. 22 had an excessively low C content and an excessively high B content. Therefore, although the condition of tempering was appropriate, the number of coarse cementite particles CN was less than 200 particles/100 μm$^2$. As a result, $K_{ISSC}$ was 22.6 MPam$^{0.5}$ or less, so that the SSC resistance was small.

As aforementioned, the embodiment of the present invention has been explained. However, the aforementioned embodiment is merely an exemplification for carrying out the present invention. Accordingly, the present invention is not limited to the aforementioned embodiment, and the aforementioned embodiment can be appropriately modified and carried out without departing from the scope of the present invention.

The invention claimed is:

1. A low alloy oil-well steel pipe having a chemical composition consisting of:

in mass %,
C: more than 0.35 to 0.65%;
Si: 0.05 to 0.50%;
Mn: 0.10 to 1.00%;
Cr: 0.40 to 1.50%;
Mo: 0.50 to 2.00%;
V: 0.05 to 0.25%;
Nb: 0.01 to 0.04%;
sol.Al: 0.005 to 0.10%;
N: 0.007% or less;
Ti: 0 to 0.012%;
Ca: 0 to 0.005%; and
a balance being Fe and impurities,
the impurities including:
P: 0.020% or less;
S: 0.002% or less;
O: 0.006% or less;
Ni: 0.10% or less;
Cu: 0.03% or less; and
B: 0.0005% or less,
wherein
in a microstructure, a number of cementite particles each of which has an equivalent circle diameter of 200 nm or more is 200 particles/100 μm$^2$ or more
and
a yield strength is 827 MPa or more.

2. The low alloy oil-well steel pipe according to claim 1, wherein the Ti content is
0.003 to 0.012%.

3. The low alloy oil-well steel pipe according to claim 2, wherein the Ca content is
0.0005 to 0.005%.

4. The low alloy oil-well steel pipe according to claim 1, wherein the Ca content is
0.0005 to 0.005%.

* * * * *